Oct. 27, 1936.  H. R. RAFTON ET AL  2,058,503
COLLOIDAL CALCIUM CARBONATE
Filed Jan. 4, 1933
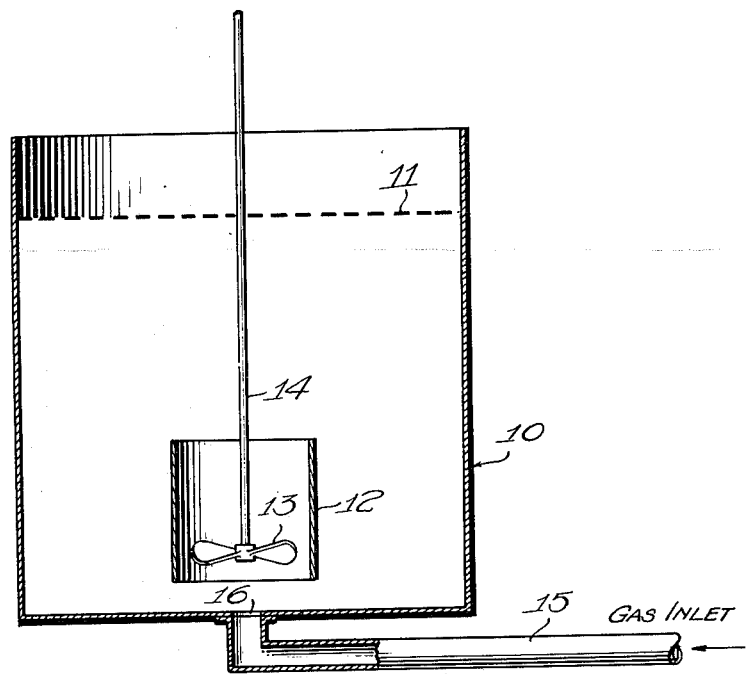
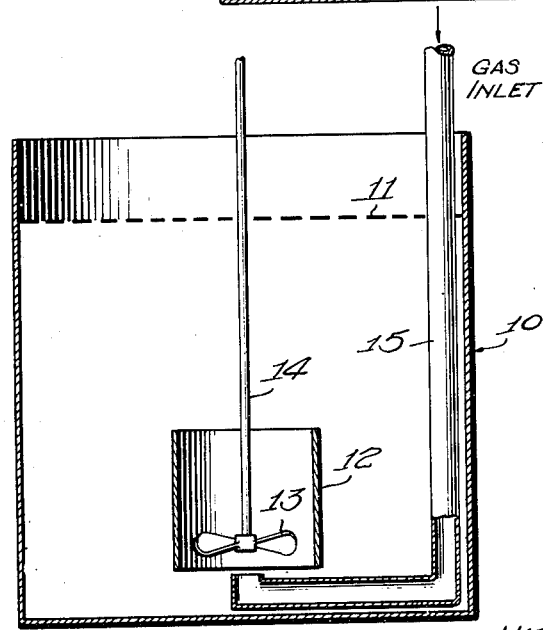
Inventor
HAROLD R. RAFTON
ARTHUR M. BROOKS
By C. L. Parker Jr.
Attorney Patented Oct. 27, 1936

2,058,503

UNITED STATES PATENT OFFICE 2,058,503

COLLOIDAL CALCIUM CARBONATE

Harold Robert Rafton and Arthur Minard Brooks, Andover, Mass., assignors to Raffold Process Corporation, a corporation of Massachusetts Application January 4, 1933, Serial No. 650,162

13 Claims. (Cl. 23—66)

This invention relates to the manufacture of colloidal calcium carbonate.

The principal object of this invention is the manufacture of colloidal calcium carbonate by a simple and economical process.

An important object is the production of colloidal calcium carbonate by the action of carbon dioxide on lime.

A further object is the production of colloidal calcium carbonate by the action of carbon dioxide on lime at controlled temperatures.

Other objects and advantages of this invention will become apparent during the course of the following description.

It is known to produce calcium carbonate by action of carbon dioxide on calcium hydroxide. It is also known to obtain calcium carbonate in a light flocculent, so-called amorphous form by passing a slurry of slaked lime through an atmosphere of carbon dioxide-containing gas. In order to obtain colloidal calcium carbonate, however, it has been found necessary to react upon an aqueous slaked lime slurry with carbon dioxide at a temperature of 15° C. or lower.

We have found by careful experiment, however, that colloidal calcium carbonate may be made by the action of carbon dioxide on lime at a temperature above 15° C. As will be apparent this is of considerable economic importance as the amount of refrigeration required to maintain a temperature of 15° C. or lower is a substantial cost element of the former process, and in certain cases requires costly apparatus in which said refrigerating effect may be applied.

The temperature zone in which we carry out the carbonation is substantially between 15° C. and 50° C. Above 50° C. colloidal calcium carbonate does not appear to be formed. On the other hand we have not found it necessary to go as low as 15° or even lower in order to obtain satisfactory results. The actual temperature we employ depends upon several controlling factors, one of which is the concentration of the lime slurry employed. As an approximate generalization it may be stated that the higher the concentration of the lime slurry the lower should be the temperature chosen for the carbonation within the zone indicated above. For example, at a lime slurry concentration of approximately 15 grams per litre, we may operate at 40° C. to 50° C. or thereabouts, whereas with lime slurry of about 110 grams per litre or more, we find it desirable to operate at 20° C. or thereabouts. Where in both the specification and claims we speak of the concentration of a lime slurry as being a certain number of grams per litre, we refer to the equivalent grams of calcium oxide per litre present in the slurry.

Another controllable factor which we find exerts an important bearing on the results obtained is the amount of water in which the lime used is slaked. As an approximate generalization it may be stated that the larger the quantity of water used in slaking, the poorer the colloidality of the precipitate produced in the carbonation. Moreover, while good results are obtainable whether the lime used is slaked in cold or warm water, we have found that on the whole the best results appear to be obtainable when the lime is slaked in water at or near the boiling point, the water being present in sufficient quantity to produce a final slurry of calcium hydroxide of thick mudlike consistency, and the slaking being carried on under conditions of vigorous agitation. With one lime of good quality we found that 1 part by weight of lime to about 5 parts by weight water gave satisfactory results. It will be apparent, however, that because of the variability in lime, different samples may be require more or less water to produce a suitable consistency.

Likewise the concentration of the carbon dioxide in the gas used for carbonation has an effect. As an approximate generalization it may be stated that at the lower carbon dioxide concentrations it appears to be desirable to use lower temperatures to obtain colloidal precipitates, whereas at higher concentrations apparently higher temperatures within the zone mentioned above may be used. When we speak of gas of lower concentration, we mean gas such as ordinary flue gas which may contain approximately 10 to 15 per cent. or thereabouts of carbon dioxide. Gases of still lower carbon dioxide concentrations may however be used if desired. When we speak of gas of higher concentration we mean gas such as may be obtained from lime kilns which may contain from approximately 30 to 40 per cent., or thereabouts, of carbon dioxide. Gases of higher concentrations than this are of course obtainable and are usable with satisfaction in our process, but if these are not directly available it is not necessary to go to the expense usually required to obtain gases of such higher concentrations.

To summarize: within the temperature zone in which we operate, slaking the original lime at high concentration, employing dilute slurries and relatively concentrated gas in the carbonating process, all bring about the most favorable conditions, and with such optimum conditions we may operate at 50° C., or thereabouts. However, the changing of these variables, that is, slaking at lower concentrations, using more concentrated slurries and lower concentrations of gas in the carbonating process, militates against operating in the upper range of the temperature zone, and makes it more desirable to work in the lower range to obtain the most satisfactory results. It is to be understood, however, that when operating under the optimum conditions described the lower temperature range may also be employed with satisfaction if desired.

Other variables of the process are time, rate of flow of gas, and pressure. These three variables are more or less interrelated. As will be apparent the time of the reaction will depend to a certain extent upon the amount of carbon dioxide available in the slurry for absorption within a given time. This in turn will depend among other things upon rate of flow and upon the pressure. Increased pressure will naturally bring about the presence of more gas within the slurry in a given time. These variables have been found, however, not to be of controlling importance in the final result, and therefore are adjusted from the standpoint of the economic situation rather than from the necessities of the reaction. For example, where gas such as flue gas of little or no cost is used, a rate of gas flow through the slurry may be such that not all the carbon dioxide is absorbed, which may reduce the time required by the reaction to a certain extent. On the other hand where there is considerable expense in preparing the gas, the rate of admission of gas to the slurry is naturally controlled to a rate which permits substantially complete absorption, which has a tendency to increase the time required by the reaction. It does not appear to offer any practical advantage to feed the carbon dioxide containing gas to the slurry at a rate slower than that at which it can be substantially completely absorbed.

Relative to pressure, of course a greater weight of gas per unit of time may be introduced at higher pressures and a lesser weight at lower pressures. However, whereas the reaction may be satisfactorily carried out at either sub- or superatmospheric pressure, we have found it convenient to conduct it at substantially atmospheric pressure because of the complications of apparatus involved when working at pressures other than atmospheric.

In the preferred practice of our invention we slake lime preferably in hot or boiling water so that a final slurry of pasty mud-like consistency will be obtained. For this purpose it is convenient to employ an apparatus equipped with a slow-moving agitator of strong construction, such for example as a vertical cylindrical tank equipped with a central vertical agitating shaft carrying a horizontal arm attached thereto some distance above the bottom of the tank, said horizontal arm being equipped with flexible steel fingers reaching from the arm substantially to the tank bottom. A high speed agitator may be employed at this point instead of the above stirring device, but usually it is not so easy with such an apparatus to obtain the desired thickness of slurry as it is with a relatively slow moving flexible finger type agitator.

The slaking reaction is allowed sufficient time for completion, usually from one to several hours, steam being introduced into the slurry during this time if desired, and then the slaked mass is allowed to cool or is artificially cooled if desired, and water added to give a slurry having a concentration of about 30 grams per litre. Of course this extra water may be added at any time after the slaking has been substantially completed.

The carbonation reaction may be carried out in the slaking tank particularly if that be equipped with a high speed agitator, but if it is not, inasmuch as vigorous agitation brings about a desirable completeness of absorption of gas in a relatively short time especially when using gases of low carbon dioxide concentration, we prefer to use for this reaction a container such as a vertical cylindrical tank equipped with a high speed agitator. In such a tank which may contain a propeller agitator with a draft tube, or other efficient agitator such as a turbo mixer, the reaction between carbon dioxide and lime may suitably be conducted by leading the gas into the tank as by a pipe entering the bottom of the tank (or the lower part of the slurry) at the central point and causing it to be incorporated into the bulk of liquid in relatively finely divided form by the action of the agitator.

Apparatus of this character is shown in the accompanying drawing, in which

Figure 1 is a diagrammatic sectional view of a reaction tank showing one arrangement of the gas inlet pipe, and, Figure 2 is a diagrammatic sectional view of the reaction tank showing a modified arrangement of the gas inlet pipe.

Referring to the accompanying drawing, the numeral 10 designates a vertical cylindrical reaction tank in which the lime slurry is treated, the upper surface of which is indicated at 11. The reaction tank is provided with a draft tube 12 in which is arranged a propeller agitator 13 carried on the lower end of a drive shaft 14. A gas inlet pipe 15 is provided with its discharge end arranged below and adjacent to the lower end of the draft tube 12. In the form of apparatus shown in Figure 1, the gas inlet pipe 15 is arranged outside of the reaction tank 10 and the discharge end of the pipe communicates with an opening 16 in the bottom wall of the reaction tank 10. In the modification of the apparatus shown in Figure 2, the inlet pipe 15 is arranged within the reaction tank 10, as shown.

The reaction between the carbon dioxide and lime is exothermic and consequently some means must be taken to dissipate the heat evolved. It is usually possible when operating at a temperature range of 35 to 50° C. which is a range we find it convenient to employ with relatively dilute slurries, and using a tank of moderate capacity, to dissipate the heat by the natural convection currents of air which surround the reaction vessel; but if desired artificial cooling of the vessel by any suitable means such as a cooling jacket or internal cooling coils or the like may be employed. The carbonation is continued until substantially all the lime present in converted into calcium carbonate. This point may be determined by testing for the presence of free lime in the slurry, or by testing the carbon dioxide content of the exit gases, which rises quite sharply after carbonation has been completed.

Of course, as will be understood, the lime may be slaked at another plant, and conveyed to the place where it is to be carbonated, but such a procedure is usually wasteful from the standpoint of transportation cost. Likewise, hydrated lime, that is, the dry commercial product so-called, may be mixed with water and carbonated, but we have found that in general inferior results are obtained by this practice, and it is not our preferred method. Moreover, it is possible to conduct the slaking and carbonation processes simultaneously or to carbonate lime which has been only incompletely slaked, but here again such procedure although contemplated within the scope of our invention is not our preferred practice. Moreover it is possible to carbonate part of the slurry within the 15°-50° temperature zone, and then carbonate the remainder at a higher temperature, but such procedure is not preferred as it produces a mixture of colloidal calcium carbonate and the non-colloidal calcium carbonate produced at the higher temperature.

Owing to convenience, if the plant for manufacturing this colloidal calcium carbonate is located at or near a lime kiln we prefer to use lime kiln gases. Otherwise we usually employ ordinary flue gas preferably suitably purified by known means to remove the ash, dirt, soot or other discoloring impurities, solid, liquid or gaseous, which may accompany the flue gas, but in general we do not usually find it necessary to remove gases which may contaminate the flue gases such as sulphur dioxide, hydrogen sulphide and the like, unless these are present in excessive amounts, as ordinarily these do not contaminate the final product to any commercially important extent. If, however, it be found desirable to remove these, this may be done by suitable means such for example as passing over limestone to remove sulphur dioxide. We may also burn any carbonaceous material specifically to produce carbon dioxide, such as gas, coke, coal, oil, or the like, but ordinary flue gas is usually available and a satisfactory inexpensive source of carbon dioxide for our purpose.

We prefer as stated above to carry out our reaction until the carbonation is substantially complete, that is, until all the calcium hydroxide is converted into calcium carbonate. However if for any purpose a mixture of colloidal calcium carbonate and calcium hydroxide is required, this falls within the scope of our invention, and may be conveniently prepared by our process by stopping the carbonation at any desired point before completion.

The calcium carbonate produced in our process has distinct colloidal properties as evidenced, for example, by its extremely slow settling rate in water. However, of course, it is true that the colloidality of the material produced under our optimum conditions may be superior to that not so produced but still produced within our 15°-50° C. temperature zone. Our material is distinct from the so-called amorphous or light flocculent variety of calcium carbonate, as our calcium carbonate when dry is relatively dense. Apparently the method of contacting the gas within the slurry has an important bearing on producing the colloidal variety, as where the gas is the external phase and the slurry is allowed to fall through the gas, the colloidal form does not appear to be produced within the temperature zone we employ.

Where we use the word "lime" we mean a high calcium lime, that is, one which contains substantially no or only commercially unimportant quantities of magnesia. The limes containing magnesia such as dolomitic lime react quite differently from calcium lime, and under the conditions herein described, produce a combination of calcium carbonate and a magnesium basic compound which differs in both physical and chemical properties from the colloidal calcium carbonate of our invention.

Our material is useful wherever calcium carbonate possessing colloidal properties is desirable, particularly in the paper industry where it may be used either as a filler for paper or as a coating pigment for paper.

The material may be used directly in wet suspension and this is convenient where it is to be used directly as a filler in paper, but where it is to be used as a coating pigment, it is usually desirable to concentrate it as by filterpressing or the like.

The material may be dried if desired and used dry, in which case appropriate means should be taken to disperse it properly in the substance or article in which it is to be employed, such as in rubber for example. If shipment be required, and if subsequent wetting is to be employed as when the material is to be used in the paper industry, we prefer not to dry the calcium carbonate to the complete removal of water but prefer to leave a residual amount of water therein, which may conveniently be 5 to 10 per cent. This aids materially in the wetting up of this product, as there is sometimes difficulty in dispersing colloidal carbonate which has been dried with a complete removal of water. Of course, if desired, adjuvants to aid a subsequent wetting may be incorporated with the material before drying, such as organic materials as gums, proteins or the like, but in general we prefer not to use such materials as they contaminate the product for uses where the pure material is required, and further add to the expense of preparing the material.

What is known in the art as "lime water" is a solution of calcium hydroxide in water, in the absence of calcium hydroxide in excess of that which will dissolve in the water. However, where in the claims we speak of subjecting material such as calcium hydroxide or lime in the presence of water to carbon dioxide we mean that there shall be present at the start of the reaction such material in the solid phase in excess of, and usually in great excess of, that amount which will dissolve in the water present.

Where in the claims the word "water" is employed, it is to be understood as referring to water in the liquid phase, and wherein the claims the word "introducing" is used with reference to carbon dioxide or the like into an aqueous mix or the like, it is to be understood that the gas is introduced into the mix itself under the surface thereof, the reaction taking place in the main body of the mix, in contradistinction to any prior art reaction taking place by projecting, spraying or splashing drops of lime slurry into an atmosphere containing carbon dioxide.

While we have described in detail our invention, it is to be understood that the various illustrative proportions, concentrations, conditions, times, apparatus, pressures, and the like may be widely varied without departing from the spirit of our invention or the scope of the subjoined claims.

We claim:

1. In a process of manufacturing calcium carbonate wherein calcium hydroxide in the presence of water is subjected to carbon dioxide, the improvement for producing the calcium carbonate in substantially colloidal form which comprises introducing carbon dioxide into an aqueous mix containing calcium hydroxide, by leading the carbon dioxide into a body of the mix under the surface thereof, said calcium hydroxide being present in an amount in excess of that which will dissolve in the water present, while maintaining said mix at a temperature above 15° C. and below substantially 50° C.

2. In a process of manufacturing calcium carbonate wherein lime in the presence of water is subjected to carbon dioxide, the improvement for producing the calcium carbonate in substantially colloidal form which comprises introducing carbon dioxide into a mix of water and lime, by leading the carbon dioxide into a body of the mix under the surface thereof, said lime being present in excess of the amount which will dissolve in said water, while maintaining said mix at a temperature above 15° C. and below substantially 50° C.

3. In a process of manufacturing calcium carbonate wherein lime in the presence of water is subjected to carbon dioxide, the improvement for producing the calcium carbonate in substantially colloidal form which comprises introducing carbon dioxide into a mix of water and lime, by leading the carbon dioxide into a body of the mix under the surface thereof, said lime being present in excess of the amount which will dissolve in said water, while maintaining said mix at a temperature above 15° C. and below substantially 50° C., under conditions of vigorous agitation.

4. In a process of manufacturing calcium carbonate wherein slaked lime in the presence of water is subjected to carbon dioxide, the improvement for producing the calcium carbonate in substantially colloidal form which comprises introducing carbon dioxide into a mix of water and slaked lime, by leading the carbon dioxide into a body of the mix under the surface thereof, said slaked lime being present in excess of the amount which will dissolve in said water, while maintaining said mix at a temperature above 15° C. and below substantially 50° C.

5. In a process of manufacturing calcium carbonate wherein slaked lime in the presence of water is subjected to carbon dioxide, the improvement for producing the calcium carbonate in substantially colloidal form which comprises introducing flue gas into a mix of water and slaked lime, by leading the flue gas into a body of the mix under the surface thereof, said slaked lime being present in excess of the amount which will dissolve in said water, while maintaining said mix at a temperature above 15° C. and below substantially 50° C.

6. In a process of manufacturing calcium carbonate wherein lime in the presence of water is subjected to carbon dioxide, the improvement for producing the calcium carbonate in substantially colloidal form which comprises slaking lime to a thick slurry with water, diluting said slurry with water but not more than to a minimum concentration of substantially 15 grams per litre to provide a slurry containing slaked lime in excess of the amount which will dissolve in the water present, and introducing carbon dioxide into said diluted slurry, while maintaining said diluted slurry at a temperature above 15° C. and below substantially 50° C.

7. In a process of manufacturing calcium carbonate wherein lime in the presence of water is subjected to carbon dioxide, the improvement for producing the calcium carbonate in substantially colloidal form which comprises slaking lime to a thick slurry with hot water, diluting said slurry with water but not more than to a minimum concentration of substantially 15 grams per litre to provide a slurry containing slaked lime in excess of the amount which will dissolve in the water present, and introducing carbon dioxide into said diluted slurry, while maintaining said diluted slurry at a temperature above 15° C. and below substantially 50° C.

8. In a process of manufacturing calcium carbonate wherein slaked lime in the presence of water is subjected to carbon dioxide, the improvement for producing the calcium carbonate in substantially colloidal form which comprises introducing carbon dioxide into a mix of water and slaked lime, by leading the carbon dioxide into a body of the mix under the surface thereof, said slaked lime being present in excess of the amount which will dissolve in said water, while maintaining said mix at a temperature above 15° C. and below substantially 40° C.

9. In a process of manufacturing calcium carbonate wherein slaked lime in the presence of water is subjected to carbon dioxide, the improvement for producing the calcium carbonate in substantially colloidal form which comprises introducing carbon dioxide into an aqueous mix containing slaked lime at a concentration of approximately 30 grams per litre, while maintaining said mix at a temperature above 15° C. and below substantially 50° C.

10. In a process of manufacturing calcium carbonate wherein slaked lime in the presence of water is subjected to carbon dioxide, the improvement for producing the calcium carbonate in substantially colloidal form which comprises introducing a gaseous mixture containing approximately 30 to 40% of carbon dioxide into an aqueous mix containing slaked lime, by leading the gaseous mixture into a body of the mix under the suface thereof, said slaked lime being present in an amount in excess of that which will dissolve in the water present, while maintaining said mix at a temperature above 15° C. and below substantially 50° C.

11. In a process of manufacturing calcium carbonate wherein lime in the presence of water is subjected to carbon dioxide, the improvement for producing the calcium carbonate in substantially colloidal form which comprises slaking one part by weight of lime in approximately 5 parts by weight of water, diluting said slurry with water but not more than to a minimum concentration of substantially 15 grams per litre to provide a slurry containing slaked lime in excess of the amount which will dissolve in the water present, and introducing carbon dioxide into said diluted slurry, while maintaining said diluted slurry at a temperature above 15° C. and below substantially 50° C.

12. In a process of manufacturing calcium carbonate wherein lime in the presence of water is subjected to carbon dioxide, the improvement for producing the calcium carbonate in substantially colloidal form which comprises slaking one part by weight of lime in approximately 5 parts by weight of water, diluting said slurry with water to provide a diluted slurry having a concentration of approximately 30 grams per litre, introducing into said diluted slurry a gaseous mixture containing approximately 30 to 40% of carbon dioxide, while maintaining said diluted slurry at a temperature above 15° C. and below substantially 50° C.

13. In a process of manufacturing calcium carbonate wherein lime in the presence of water is subjected to carbon dioxide, the improvement for producing the calcium carbonate in substantially colloidal form which comprises slaking one part by weight of lime in approximately 5 parts by weight of water, diluting said slurry with water but not more than to a minimum concentration of substantially 15 grams per litre to provide a slurry containing slaked lime in excess of the amount which will dissolve in the water present, and introducing carbon dioxide into said diluted slurry, while maintaining said diluted slurry at a temperature above 15° C. and below substantially 40° C.

HAROLD ROBERT RAFTON.
ARTHUR MINARD BROOKS.